Patented Apr. 9, 1946

2,398,001

UNITED STATES PATENT OFFICE 2,398,001

INSULATING MATERIAL

Clifford I. Haney and Mervin E. Martin, Cumberland, Md., assignors to Celanese Corporation of America, a corporation of Delaware No Drawing. Application June 11, 1942,
Serial No. 446,614

6 Claims. (Cl. 106—122)

This invention relates to insulating material, and relates more particularly to insulating materials having a basis of regenerated cellulose.

The present application is a continuation in part of our copending application S. No. 398,547, filed on June 18, 1941.

An object of our invention is the production of heat insulation materials from materials having a basis of regenerated cellulose of a cellular structure.

Another object of our invention is the production of heat insulation material of low density which may be easily fabricated in any desired shape.

Still another object of our invention is the production of heat insulation material which is relatively inexpensive, highly resistant to the action of organisms such as fungi, and which has a low specific thermal conductivity.

Other objects of our invention will appear from the following detailed description.

Materials having a cellular structure have long been employed for insulation purposes. The material most commonly employed has been cork, which has usually been employed in the form of boards of varying thicknesses. The cork board is prepared by compressing particles of finely divided cork, with or without some binding material, under sufficient pressure to cause the particles to adhere. In place of cork, it has been proposed to prepare insulating materials from other materials having a cellular structure, such as, for example, those prepared from thermoplastic materials having a basis of a cellulose ester.

Such cellular materials have been prepared in several ways. According to one method the cellulose ester is dissolved in a solvent to produce a viscous solution and there is incorporated therein a solid which is capable of being decomposed by heat or chemical treatment to yield a gas. After the solution has been set, or substantially set, the mass is then treated so as to decompose the gas-generating solid and the generation of the gas therefrom causes the formation of hollow spaces throughout the mass, resulting in a porous or cellular structure. The disadvantage of this process is that the pore size is variable and irregular, and there is difficulty in ensuring that all of gas-generating solid is decomposed. In accordance with another method, a solution of a cellulose ester in a volatile solvent is prepared and soluble inorganic salts of appreciable particle size are mixed therewith. After the solution has been suitably shaped and then set by removal of the solvent, the soluble salts are extracted with water from the body of the shaped cellulose ester leaving behind a cellular mass or structure.

By yet another method, a product having pores of substantially uniform size may be obtained without the necessity of incorporating inorganic matter therein. In accordance with the latter process, there is added to the cellulose ester in finely divided form, a volatile liquid or mixture of liquids having, in the vapor state, at least a solvent, swelling or softening action thereon, and the mixture is subjected to the action of elevated temperature and pressure in a closed chamber. Examples of the liquids or liquid mixtures which may be employed are acetone, ethyl alcohol, ethyl alcohol and benzol, water, chloroform, ethylene dichloride, acetone and ethyl or methyl alcohol, ethylene dichloride, and ethyl or methyl alcohol, methyl chloride and ethyl or methyl alcohol, butanol, diacetone alcohol, and gasoline hydrocarbons, as well as mixtures of organic liquids with various amounts of water. While all these liquids are suitable, acetone, butanol, ethyl alcohol, and mixtures of these liquids with water or benzol, are preferably employed. The conditions of elevated temperature and pressure are maintained until the cellulose ester is at least partially converted and the pressure is then suddenly released. The sudden release of the pressure while the treated material is at an elevated temperature allows the liquid absorbed therein to vaporize with extreme rapidity and the cellulose ester is expanded to a strong, film, cellular material of low density and even texture suitable for many purposes. Among the uses of the product of this process is the employment of the expanded material for thermal insulating processes. When forming a board from the comminuted material made in accordance with this prior process by subjecting the latter to pressure in the presence of a binding agent, the necessary pressure often destroys the cellular character of the material. Such change substantially reduces the thermal efficiency of the material. Also due to the thermoplastic nature of the material its scope of usefulness is circumscribed because of the fact that it is subject to some deformation at elevated temperatures.

We have now discovered that insulating material of high thermal efficiency having certain advantages over the insulating material of the prior processes may be prepared by uniting comminuted, regenerated cellulose materials prepared by the saponification in whole or in part of discrete particles of expanded cellulose ester materials. In accordance with our invention, expanded cellular material having a basis of a cellulose ester obtained for example, by any of the processes outlined above, is reduced to a comminuted form and the resulting cellular material of small particle size is subjected to the action of a suitable saponifying bath. The regenerated cellulose particles obtained in this manner retain the cellular structure originally present. When such particles are set in the desired form by means of a suitable binding agent, the resulting product is a material of low density possessing a high thermal insulating efficiency, as indicated by its low heat transfer coefficient. Not only may the cellular, regenerated cellulose particles be set in any desired shape, in accordance with our novel process, but the product thus obtained may be cut, sawed, nailed, etc. and may be employed wherever insulation material is necessary or desirable. In lieu of binding the particles with a suitable binding agent, the cellular particles may also be employed for insulating purposes in a loose form. When employed in this manner, the cellular particles may be placed in air spaces surrounding the chamber to be insulated and in this way an improved insulating effect may be obtained.

Conveniently, the saponification of the cellular materials may be carried out by treatment with organic saponifying agents such as for example, methyl amine, ethylene diamine, triethanolamine or other organic base, or it may be carried out with inorganic agents, such as for example, sodium hydroxide, potassium hydroxide, sodium silicate, ammonium hydroxide, sodium carbonate or other inorganic basic agent. The saponifying agents may be employed either in aqueous or in alcoholic solutions. Preferably, we employ aqueous solutions of sodium hydroxide.

The saponifying solutions employed may be of a concentration of from 1 to 8% by weight depending upon the particular agent employed. In the case of sodium hydroxide, we preferably employ aqueous solutions of a concentration of from 2 to 5% by weight. While the entire saponification may be carried out employing either an aqueous or an alcoholic solution of the saponifying agent, the saponification process may also be effected by the use of both an aqueous and an alcoholic solution of the saponifying agent. Thus, the saponification may be initiated by employing an alcoholic solution of a saponifying agent and may be completed with an aqueous solution of the same or a different saponifying agent. The complete saponification of the cellulose ester material may also be carried out by reversing these steps, i. e. by first employing an aqueous solution of the saponifying agent and then completing the saponification with an alcoholic solution of the same or a different agent. Between each saponification step, the material may be washed with water if desired.

The saponification may be continued until the cellulose ester comprising the cellular material is completely saponified or it may be interrupted before complete saponification has been effected, e. g. when the cellular material has been saponified so that it loses about 25% of its weight. Thus, the saponification may be carried out for from ½ to 5 hours and at a temperature of from 20 to 100° C. depending upon the concentration of the saponifying agent, and the speed and degree of saponification desired. When saponification has proceeded to the desired extent, it may be halted by washing the particles with water.

The saponification and washing may comprise a batch process or it may comprise a continuous process, the discrete cellular particles of the cellulose ester being carried through the saponifying bath at any desired speed as by a screw conveyor or the equivalent, followed by washing in a similar manner. After washing, the regenerated cellulose particles may be dried.

The size of the discrete particles employed in the production of insulating material in accordance with our invention has a definite bearing on the properties of the final product. If the particle size too closely approaches the size of the individual cells present in the structure, the cellular character will largely be destroyed and the effect of temperature and pressure will cause the product to be substantially solid in character rather than cellular, since the material being subjected to treatment will be more in the nature of a powder substantially devoid of cells. For this reason the average particle size should be at least larger than the average size of the cells so that the cellular nature of the material may be retained. The size of the particles may, of course, be considerably larger than this.

To enable the regenerated cellulose particles to be formed into a firm mass, the particles are held together by a suitable binding agent. The binding agent may be a glue, such as casein glue, animal glue or vegetable glue. It may also be a derivative of cellulose, such as cellulose acetate, or a resin or gum, applied with a volatile solvent in the form of a solution, or applied as a powder mixed with the regenerated cellulose and then treated with a solvent to effect a binding of the particles. It may, however, be an inorganic binding agent such as, for example, sodium silicate. In some cases it is desirable to employ a binding agent such as a natural or synthetic thermoplastic or thermosetting resin in gum or powder form, and, after mixing the binding agent with the regenerated cellulose, subjecting the mixture to a shaping operation under the action of heat and pressure. A partially polymerized binding agent may also be employed, and after shaping the particles of regenerated cellulose, the binding agent may be further polymerized in situ to form a shaped insulating material. Examples of suitable synthetic resins are phenol-formaldehyde products, cumaron resins, glyptal resins, polymerization products of vinyl compounds, and the like, while suitable natural resins are colophony, balsam, copaiba, dammar, elemi and mastic. The binding agent may be employed in an amount ranging from 1 to 5% on the weight of the regenerated cellulose particles. The volatile solvent employed may be acetone, diethyl ether, ethyl acetate, carbon tetrachloride, ethyl alcohol, methyl alcohol, or the like.

The cellular product of this invention may be used as insulating material in any convenient manner. For insulating material in the form of board, a thin layer of the mix may be shaped between broad, flat molding surfaces, while for insulating material of other shapes, suitably shaped molds may be employed. The mix may also be extruded in the desired shape through suitably shaped orifices by means of a screw stuffer, or the like. After being suitably shaped the insulation material may be treated or coated in any manner to render it water-proof or water-resistant. Such treatment may comprise sealing the surface with a water-proofing material such as pitch or other water-insoluble or water-resistant coating, or treating the formed insulating material with formaldehyde or the like to render the regenerated cellulose water-resistant. When used in a loose form the cellular particles may be blown into the air spaces or placed therein in any other convenient manner.

In order further to illustrate our invention but without being limited thereto, the following examples are given.

*Example I*

200 parts by weight of cellulose acetate having an acetyl value of 54.5% (calculated as acetic acid) is ground until it is of 20–30 mesh fineness and mixed thoroughly with 20 parts by weight of butanol. The mixture is heated at 200° C. for 1 minute under a pressure of 3000 lbs./sq. in. gauge. The pressure is released suddenly and the cellulose acetate allowed to expand to its maximum volume. The mass is broken up into small particles of about 0.5 to 1.0 cm. square. The expanded cellulose acetate particles are saponified for 3 hours with 1340 parts by weight of a 5% solution of sodium hydroxide maintained at 50° C. The regenerated cellulose particles are washed free of alkali and dried at 100° C. for 2 hours.

75 parts by weight of the dried, regenerated cellulose particles are mixed with 75 parts by weight of a 15% solution of cellulose acetate having an acetyl value of 40% in a 85/15 acetone/water solvent. The mixture is placed in a square mold and maintained at 120° C. for ½ hour. The firm cake obtained in this manner is maintained at 100° C. to remove all of the residual acetone. The product has a density of 0.16 and a heat transfer coefficient of 0.201 cal./hour/cm.$^2$/°C./cm. A cork board of similar dimensions has a heat transfer coefficient of 0.335, employing the same units.

*Example II*

Regenerated cellulose insulating material in cake form is prepared in accordance with Example I. 10 parts by weight of the material is treated at 150° C. for 45 minutes with 100 parts by weight of 40% commercial formaldehyde at a pressure of 50 lbs./sq. in. The material is dried at 100° C. for 12 hours to remove the remaining formaldehyde. The resulting product is moisture-proofed. It has a density of 0.166 and a heat transfer coefficient of 0.238 cal./hour/cm.$^2$/°C./cm.

*Example III*

200 parts by weight of cellulose acetate having an acetyl value of 54.5 (calculated as acetic acid) is ground until it is of 20–30 mesh fineness and mixed thoroughly with 20 parts by weight of a 50%–50% mixture by volume of ethyl alcohol and benzol. The mix is treated as in Example I for expansion. The disintegrated pieces are saponified in 2,000 parts by weight of 5% alcoholic potassium hydroxide solution at 76° C. for 1 hour. The particles of regenerated cellulose are then washed several times with water, given a soaking for 1 hour in 1 liter of 1% aqueous acetic acid, washed acid free, and dried at 100° C. for 2 hours.

75 parts by weight of this material is mixed with 10 grams of a solution of partially polymerized phenol-formaldehyde resin, the resin solution being prepared as follows: 2 parts by weight of 40% formalin solution containing 1% of its weight of sulfuric acid to act as a catalyst is mixed with 1 part by weight of phenol. The mixture is heated to boiling under reflux, and when the boiling point is reached, the heat source is removed and the reaction mixture continues to boil due to the exothermic nature of the reaction. After about 3 to 4 minutes, the polymer which forms becomes insoluble in the solution and separates. Polymerization ceases. The resin is washed with water, an excess of sodium carbonate added, and the resin stirred to permit complete neutralization of the sulfuric acid in the resin. The resin is then washed several times with water with agitation, the water decanted or otherwise removed, and the resin dissolved in acetone, three parts acetone by weight to one part resin by weight.

The mixture of resin and cellular regenerated cellulose particles is heated in a mold at 150° C. for 30 minutes under a pressure of 2 pounds per square inch, the elevated temperature causing the acetone solvent to evaporate and the resin therein to polymerize further, rendering the resin insoluble in acetone and other organic solvents. This polymerization cements the particles of regenerated cellulose into a firm coherent mass. The density of this material is 0.16 and it has a heat transfer coefficient of 0.2 cal./hour/cm.$^2$/°C./cm.

While our invention has been more particularly described in connection with the use of cellulose acetate in the preparation of our novel insulating material, other cellulose esters may also be employed. Examples of other cellulose esters are cellulose propionate and cellulose butyrate, mixed esters such as cellulose acetate-propionate and cellulose acetate-butyrate, and inorganic esters, such as cellulose nitrate, preferably of low nitrogen content. Where cellulose acetate is employed it may have an acetyl value of 40% to 62.5%, determined as acetic acid.

In order to increase the strength or to modify the appearance or properties of the objects being molded or extruded, fibrous or other fillers may be incorporated therein. Examples of such fibrous fillers are fibers of cotton, flax, hemp, ramie, jute and natural silk, while examples of other filling materials are cork, sawdust, wood shavings, clay, asbestos, etc., or mixtures of these. In addition, pigments may be incorporated in the material or the material may be dyed to obtain color effects. Suitable fire-retardants such as, for example, $NaHCO_3$, $Na_3PO_4$, $SnCl_2$ and $MgSiO_3$ may also be incorporated in the insulation materials to reduce any fire hazard.

It is to be understood that the foregoing detailed description is merely given by way of illustration and that many variations may be made therein without departing from the spirit of our invention.

Having described our invention, what we desire to secure by Letters Patent is:

1. Process for the production of heat-insulation material from a cellulose ester of cellular structure, which comprises saponifying discrete particles of a cellulose ester of a cellular structure to obtain a regenerated cellulose of cellular structure, mixing said regenerated cellulose in a solution of an adhesive binder in a volatile solvent and subjecting the resulting mixture to a shaping operation at elevated temperature.

2. Process for the production of heat-insulation material from cellulose acetate of cellular structure, which comprises saponifying discrete particles of cellulose acetate of a cellular structure to obtain a regenerated cellulose of cellular structure, mixing said regenerated cellulose with a solution of an adhesive binder in a volatile solvent and subjecting the resulting mixture to a shaping operation at elevated temperature.

3. Process for the production of heat-insulation material from a cellulose ester of cellular structure, which comprises saponifying discrete particles of a cellulose ester of a cellular structure to obtain a regenerated cellulose of cellular structure, mixing said regenerated cellulose with an adhesive binding agent comprising a solution of a partially polymerized phenol-formaldehyde resin in a volatile solvent and subjecting the resulting mixture to a shaping operation at elevated temperature.

4. Process for the production of heat-insulation material from cellulose acetate of cellular structure, which comprises saponifying discrete particles of cellulose acetate of a cellular structure to obtain a regenerated cellulose of cellular structure, mixing said regenerated cellulose with an adhesive binding agent comprising a solution of a partially polymerized phenol-formaldehyde resin in a volatile solvent and subjecting the resulting mixture to a shaping operation at elevated temperature.

5. Process for the production of heat-insulation material from a cellulose ester of cellular structure, which comprises saponifying discrete particles of a cellulose ester of a cellular structure to obtain a regenerated cellulose of cellular structure, mixing said regenerated cellulose with an adhesive binding agent comprising a solution of cellulose acetate in a volatile solvent and subjecting the resulting mixture to a shaping operation at elevated temperature.

6. Process for the production of heat-insulation material from cellulose acetate of cellular structure, which comprises saponifying discrete particles of cellulose acetate of a cellular structure to obtain a regenerated cellulose of cellular structure, mixing said regenerated cellulose with an adhesive binding agent comprising a solution of cellulose acetate in a volatile solvent and subjecting the resulting mixture to a shaping operation at elevated temperature.

CLIFFORD I. HANEY.
MERVIN E. MARTIN.